US006650337B2

(12) United States Patent
Stradley et al.

(10) Patent No.: US 6,650,337 B2
(45) Date of Patent: Nov. 18, 2003

(54) INCREASING COLOR ACCURACY

(75) Inventors: David J. Stradley, Madison, AL (US); Deborah L. Neely, Madison, AL (US); Jeff S. Ford, Madison, AL (US); I. Claude Denton, Beaverton, OR (US)

(73) Assignee: Silicon Graphics, Inc., Mountain View, CA (US)

(*) Notice: Subject to any disclaimer, the term of this patent is extended or adjusted under 35 U.S.C. 154(b) by 240 days.

(21) Appl. No.: 09/818,931

(22) Filed: Mar. 28, 2001

(65) Prior Publication Data

US 2002/0018073 A1 Feb. 14, 2002

Related U.S. Application Data

(60) Provisional application No. 60/192,428, filed on Mar. 28, 2000.

(51) Int. Cl.[7] ........................................ G06T 11/40

(52) U.S. Cl. ........................................ 345/601; 382/299

(58) Field of Search ........................................ 345/589, 596, 345/600, 601, 602, 605, 122 FOR

(56) References Cited

U.S. PATENT DOCUMENTS 5,625,557 A * 4/1997 Colosky ..................... 340/459
5,896,122 A * 4/1999 MacDonald et al. ........ 345/602

* cited by examiner

*Primary Examiner*—Matthew C. Bella
*Assistant Examiner*—G. T. Cunningham
(74) *Attorney, Agent, or Firm*—Sterne, Kessler, Goldstein & Fox PLLC

(57) ABSTRACT

The present invention provides a system and method for converting color data from a higher color resolution to a lower color resolution. Color data is converted by first receiving a plurality of bits representing color data for an image. Next, a subset of pixels represented by the plurality of bits is selected. The color data for each pixel within the selected subset is then divided into least significant bits and most significant bits. Next, the least significant bits for each pixel within the selected subset are compared to a corresponding value in a lookup table. Finally, for each pixel within the selected subset, if the least significant bits are greater than the corresponding value in the lookup table, then the most significant bits are incremented.

1 Claim, 9 Drawing Sheets

INCREASING COLOR ACCURACY

CROSS-REFERENCE TO RELATED APPLICATIONS

This application claims priority to U.S. Provisional Patent Application No. 60/192,428, filed Mar. 28, 2000, incorporated in its entirety herein by reference.

BACKGROUND OF THE INVENTION

1. Field of the Invention

The invention generally relates to computer graphics devices and, more particularly, the invention relates to data conversion in graphics devices.

2. Background Art

Computer systems often include graphics systems for processing and transforming video pixel data so that the data can be represented on a computer monitor as an image. One such transformation is the conversion from one color space to another color space. Video pixel data from television or from video tape is typically, represented in "YUV" (luminance, differential value between the luminance and the red chrominance, differential value between the luminance and the blue chrominance) color space. In order to display such an image on a computer monitor the YUV color space information must be converted to RGB (red, green, blue) color space information. In one such system 10-bit YUV 4:4:2 data is interpolated into 10-bit YUV 4:4:4 data and then converted into 12-bit RGB data where the transformation creates 12 bits of red, 12 bits of green, and 12 bits of blue. In the current art, graphics processors have pipelines which store 8 bits for each red, green and blue value. As a result, there are 4 bits of information which cannot be used in the graphics processor. One solution to the problem is to truncate the last 4 bits of information from the 12-bit data, however this reduces the number of color variation levels that are available for representation which provides less variations of color than the human eye is capable of perceiving.

BRIEF SUMMARY OF THE INVENTION

In accordance with one aspect of the invention, a method for converting color data from a higher color resolution to a lower color resolution is disclosed. In this method, the number of colors available at the higher resolution is maintained at the lower color resolution. It should be understood that the color data is composed of a plurality of bits and that the color data is displayed on a display device as a plurality of pixels. The method begins with the selection of a subset of pixels of the image represented by the color data at the higher color resolution. Each pixel has a relative position within the subset. In one embodiment, the subset is a square group of pixels. The color data for each pixel within the subset is divided into a first part and a second part. In the preferred embodiment, the first part is composed of the most significant bits and the second part is composed of the least significant bits. The second part is compared to a corresponding value in a lookup table wherein the corresponding value is determined by the relative position of the pixel in the subset. Based upon the comparison, it is determined if the first part should be incremented. By incrementing the pixels in an ordered fashion, ordered dithering is achieved and the higher color resolution is maintained. This is done for the red, green and blue color data for each pixel of the subset either in parallel or in series.

BRIEF DESCRIPTION OF THE FIGURES

The foregoing and other objects and advantages of the invention will be appreciated more fully from the following further description thereof with reference to the accompanying drawings wherein.

DETAILED DESCRIPTION OF THE INVENTION

Figure 1:
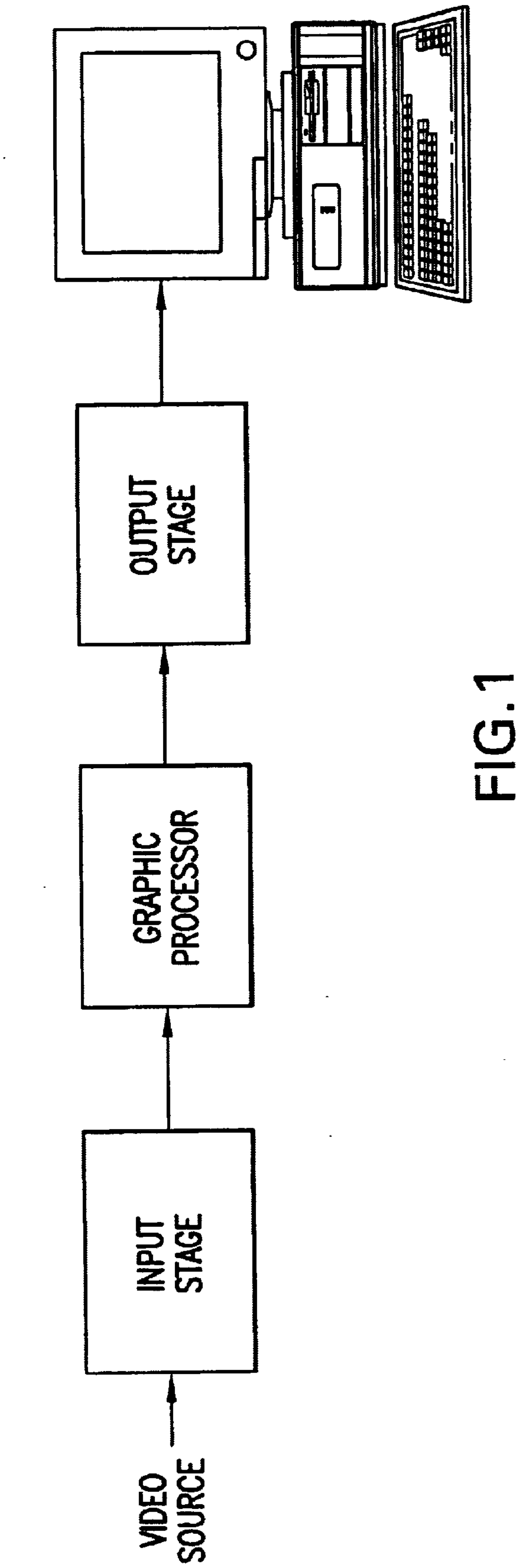
FIG. 1 shows a system in which the apparatus and method for increasing color accuracy may be implemented.

FIG. 1 shows a schematic diagram of a video processing system which receives information from a video source and displays a corresponding video image on a computer monitor composed of a number of pixels represented by video data. Typical computer monitors use video data composed of three color values (red, green and blue) for each individual pixel. The pixels are displayed at a resolution setting consisting of a number of horizontal and vertical lines of resolution.

To produce the video image, the video processing system first receives a video source into an input stage. The video source may be a television broadcast, a video tape, digital video or any other form of video data. The input stage converts an analog signal to digital video data or receives digital video data directly and transforms the digital video data into a format which is compatible with computer based systems for display on a monitor. For example, the video source might be digital television wherein the digital video data represents the colors of a pixel in YUV color space. The input stage transforms the YUV color information to RGB color information so that the video may be processed by a standard graphics processor in a computer. The data is then passed to a graphics processor. The graphics processor applies three dimensional rendering and geometry acceleration including the incorporation of effects such as shadowing to the video data. The processed video data is passed to an output stage which functions as a scan rate converter which matches the processed video data to the attached monitor's refresh rate. For a more detailed description of the input stage and the output stage see provisional patent application No. 60/147,668 entitled GRAPMCS WORKSTATION, filed on Aug. 6, 1999 and provisional patent application No.

60/147,609 entitled DATA PACKER FOR GRAPFUCAL WORKSTATION filed on Aug. 6, 1999 both of which are incorporated by reference herein in their entirety.

Figure 2:
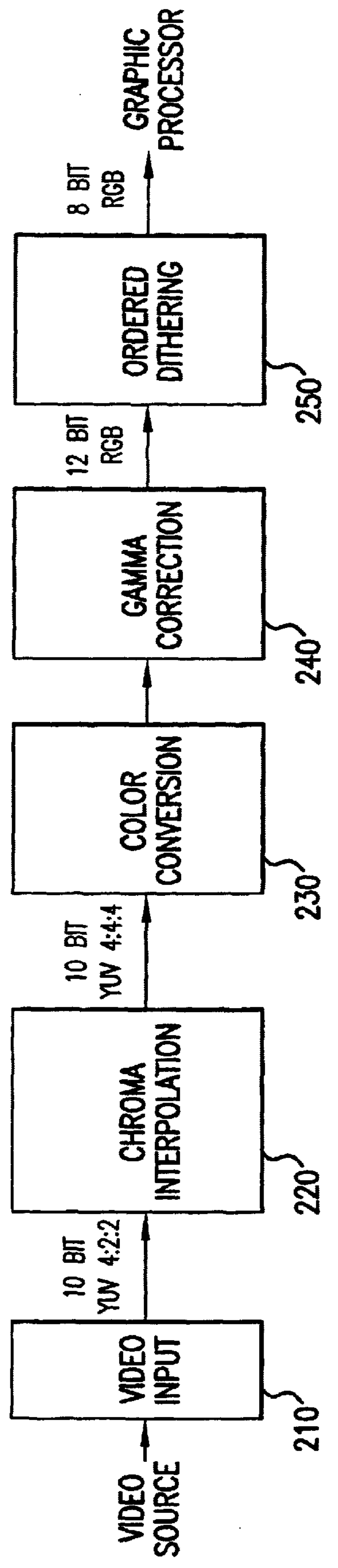
FIG. 2 shows a more detailed block diagram of the input stage of FIG. 1.

FIG. 2 shows a more detailed block diagram of the input stage of FIG. 1. A video source consisting of a stream of video data representing pixels is received into the video input 210. Based on the relative position of the video data in the received stream, the pixel's position on the computer monitor is determined. In one example, the video data that is received is 10-bit YUV 4:2:2. The video data is passed into a chroma interpolation module 220 which interpolates the chroma data creating an equal number of samples of chrominance for each line of YUV. The 10-bit YUV 4:4:4 video data is then color space corrected 230 through a standard conversion to RGB color space wherein the YUV color space is non-linear and the RGB color space is linear. The conversion takes the three 10-bit video data values one each for the luminance, the U component, and the V component and converts the samples into three 12-bit video data values, one representing red, one for green, and one for blue. The additional bits are the result of YUV color space being non-linear. In such a fashion, there are 36 bits associated with each pixel to represent the color in the RGB color space. The 12-bit values are then gamma corrected in a gamma correction module 240. The 12-bit RGB video data values are passed into an ordered dithering module 250. The ordered dithering module transforms the 12-bit video data into 8-bit video data while substantially maintaining the number of discrete steps which the 12-bit video data values are capable of representing. As a result, the 8-bit values which can represent 256 discrete levels substantially provide 4096 steps which equates to 12-bit values. The 8-bit RGB video data is then passed to a graphics processor. The graphics processor maintains an 8-bit RGB pipeline which necessitates the need for the ordered dithering module.

The ordered dithering module receives video data with a greater number of color variation levels than the subsequent graphics processor's pipeline capacity and monitor are capable of displaying. Assuming that a graphics processor is designed with a 8-bit pipeline and the display is capable of displaying only 8-bit color, there are only 256 levels of variation per color. Since the ordered dithering module is provided with video data which contains additional levels of color variation, the ordered dithering module dithers the color values between two color variation levels which are capable of being produced by the monitor over a subset area of the pixels to provide the appearance of a higher color variation level. The subset area may be an assigned area which contains a number of pixels where the number of pixels is greater than the number of additional levels of color variation that are desired. Determining the size of the area selected is achieved by weighing the number of additional levels of desired color variation and determining an approximate area size of the video image for which color frequency will not vary. In one embodiment, the subset area is a 4×4 pixel area which receives 12-bit video data values which are transformed to 8-bit video data values. Since the size of the area is 16 pixels, the number of additional color variation levels is 16. The ordered dithering module converts each 12-bit video data value to an 8-bit video data value so that the pixels may be displayed on an 8-bit monitor. The ordered dithering module varies the color variation level of a number of pixels in the subset area to the next 8-bit color intensity level for the subset area to achieve the appearance of more color variation levels. If it is determined that the desired 12-bit color variation level is 5/16 between two 8-bit color variation levels, 5 pixels of the 4×4 subset area are set to the higher intensity level.

Figure 3:
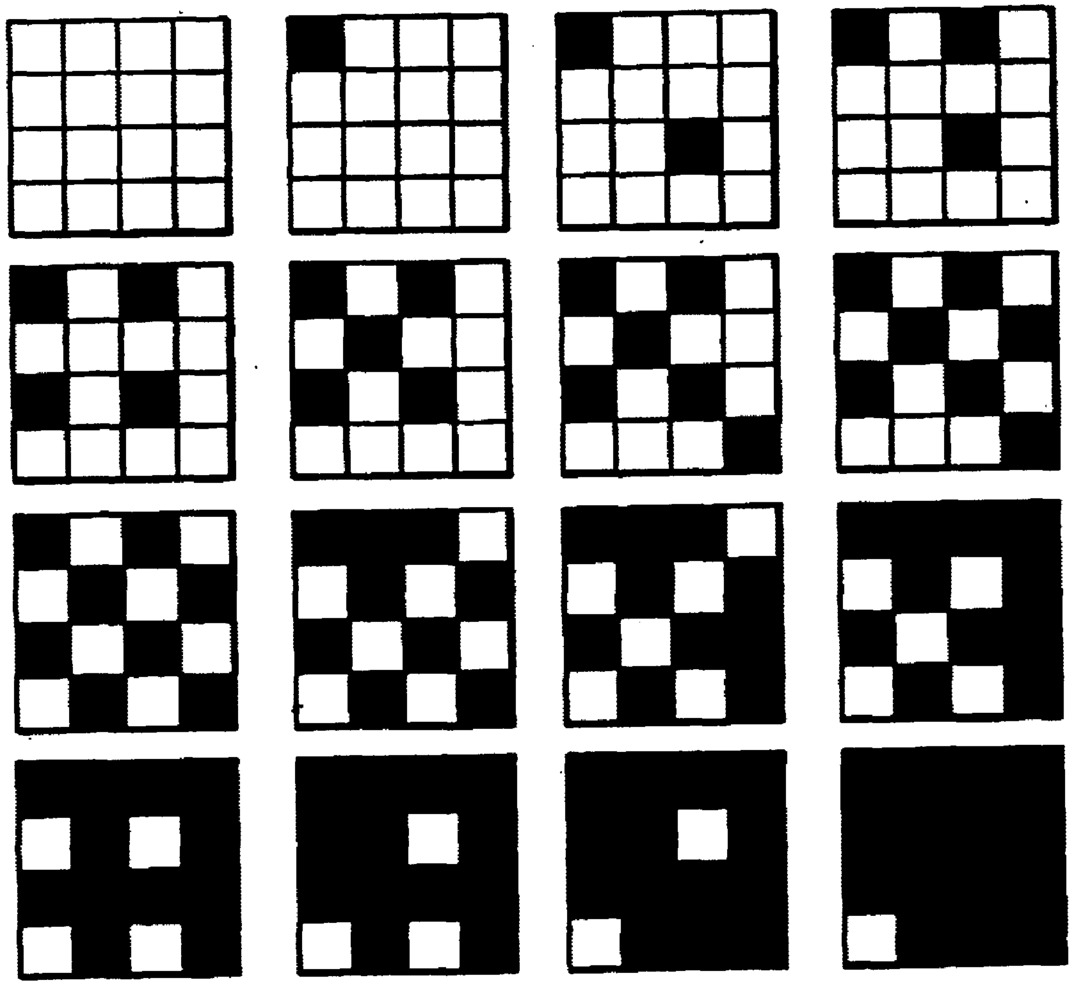
FIG. 3 shows 16 exemplary 4×4 subset areas where the pattern of pixels which are turned on to the next color variation level are shown in succession from 0 pixels through 15 pixels.

FIG. 3 shows 16 exemplary 4×4 subset area where the pattern of pixels which are turned on to the next color variation level are shown in succession from 0 pixels through 15 pixels. The ordered pattern provided in FIG. 3 assists in preventing color lines/banding from forn-ting within the image due to the dithering process. It should be apparent to one skilled in the art that other sequences of patterns in which increasing number of bits are set to a higher color variation level may be implemented for this method.

Figure 4:
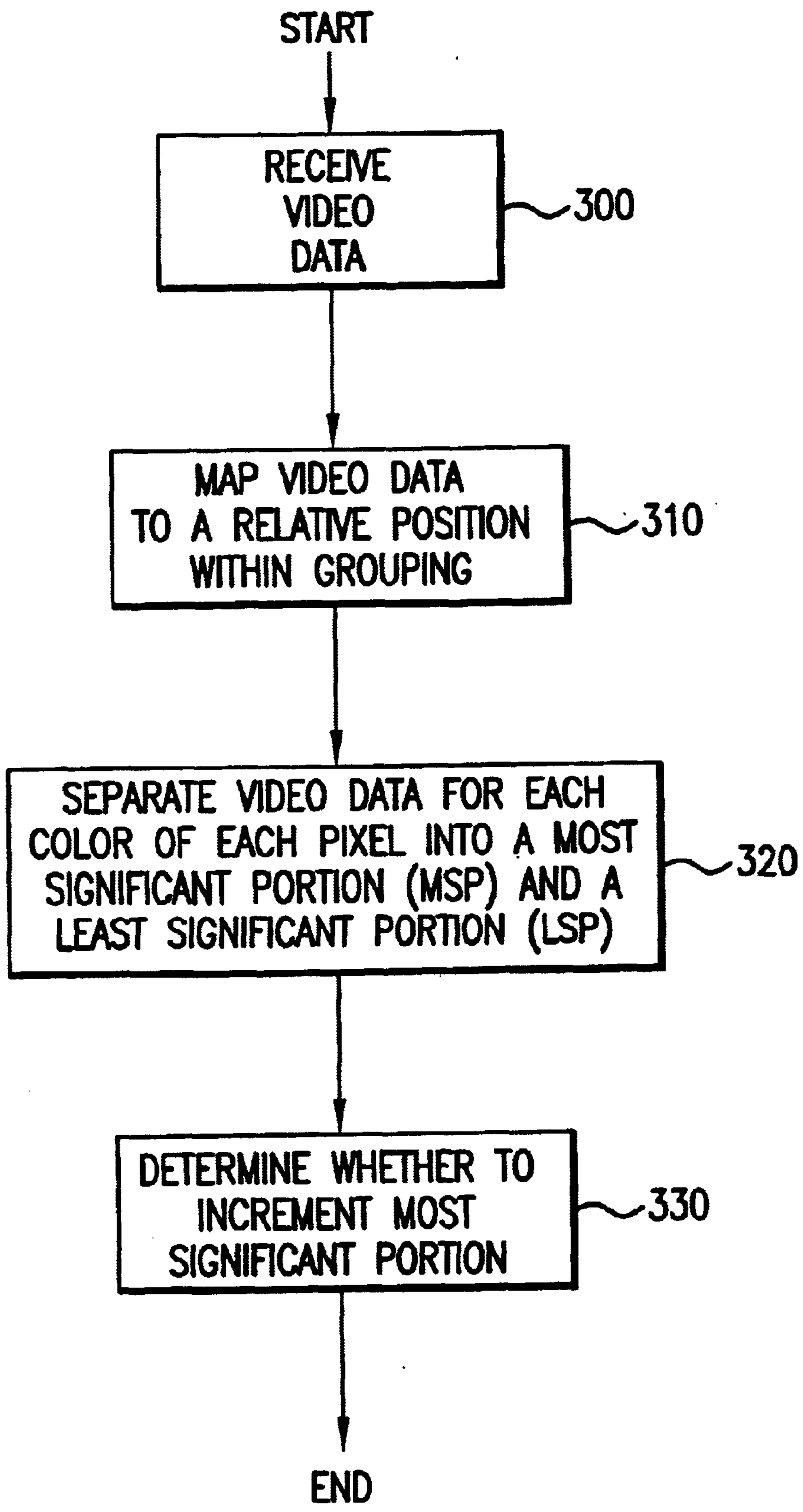
FIG. 4 shows a flow chart of the steps taken in the ordered dithering module to convert a video data sequence having a number of discrete color variation steps into a video data sequence having less discrete color variation steps while still maintaining the initial color variation for low frequency segments of the video image.
Figure 4A:
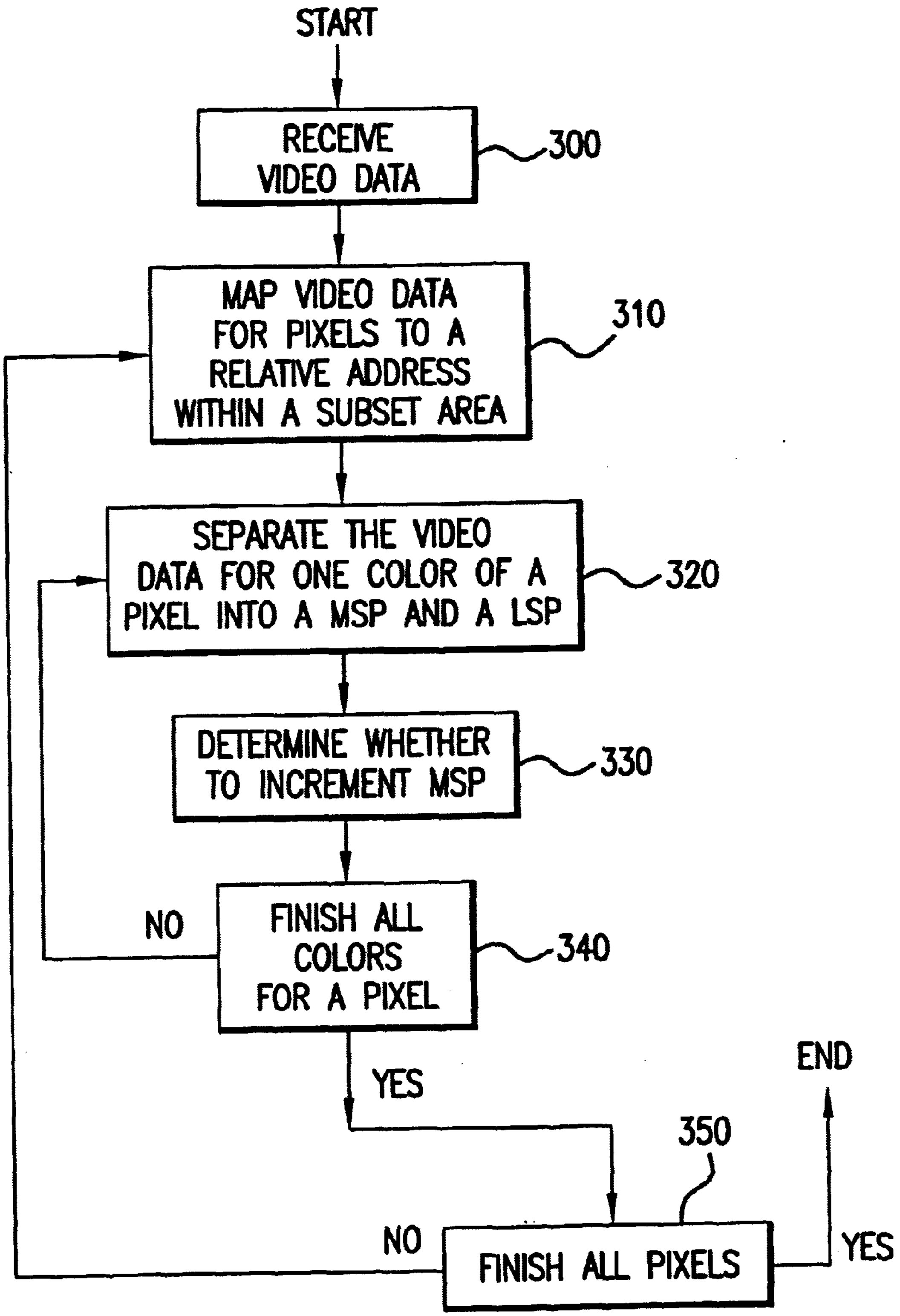
FIG. 4A shows an alternative version of the flow chart of FIG. 4.
Figure 5:
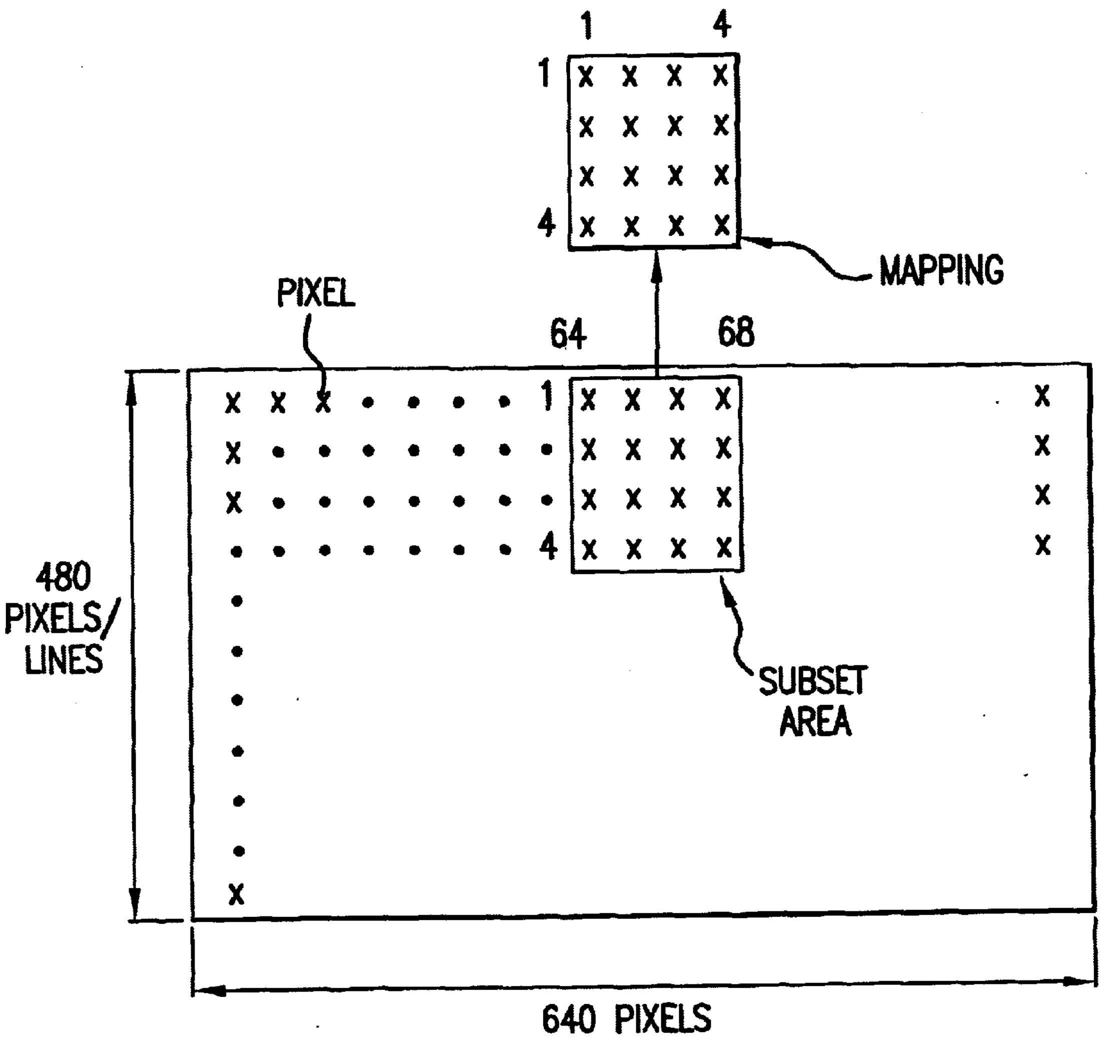
FIG. 5 shows an exemplary video screen and a subset area.

FIG. 4 shows a flow chart of the steps taken in the ordered dithering module to convert a video data sequence having a number of discrete color variation steps into a video data sequence having less discrete color variation steps while still maintaining the initial color variation for low frequency segments of the video image. Video data is streamed into and received by the ordered dithering module (step 300). The video data is composed of data for a plurality of pixels where, for example for each pixel, there are three 12-bit values representing the color intensity for red, green and blue respectively although the ordered dithering module may receive other bit sized values. The plurality of pixels form an image where the image is composed of a number of horizontal and vertical lines of resolution. For example, if there were 640×480 lines of resolution there would be 640 pixels in each horizontal line and there would be 480 lines of pixels as shown in FIG. 5. As a result, video data value for each pixel has an associated location within the image which may be represented by an address which is of the form (x,y) where x represents the position within the row and y represents the line number. This addressing scheme is used for exemplary purposes only and other addressing schemes may be used in place of this addressing scheme. Given the address associated with the video data for a pixel, the video data is mapped to a relative position within a subset area of the image (step 310). For example, one such subset may be composed of a 4×4 block of pixels and video data having a pixel location within the image with corner points of (64,I) (68, 1) (64, 4) (68, 4). This subset would be mapped to relative pixel addresses with corners of (1,1)(4,1)(1,4)(4,4). This step is performed for the entire video image segmenting the image into multiple subset areas until all of the pixels that define the video image are mapped to their relative pixel addresses within a subset area. The video data associated with the pixels in the subset area is separated into a most significant part and a least significant part for each color (step 320). For example, for the red color level (000011111010) of the pixel represented by location (1,1) the most significant part would be the first 8 bits (00001111) and the least significant part would be the last 4 bits (1010) assuming that the bit ordering from left to right is from the most significant bit to the least significant bit. The method then determines whether to increment the most significant portion for each color of each pixel within the subset area (step 330). The most significant portion then becomes the video data value which represents the color variation level for the pixel at the original location of the pixel within the displayed image. In step 340, steps 320 and 330 can be performed in succession for a single color and then looped back for the next color of a pixel until all of the pixels within the subset area are processed as shown in FIG. 4A. Similarly, in step 350, the mapping of the pixels to a relative address within the subset area may be performed in a loop until all of the pixels within the image are processed. It should be understood by one of ordinary skill in the art that different sequences of the steps can be implemented with the same result.

Figure 6:
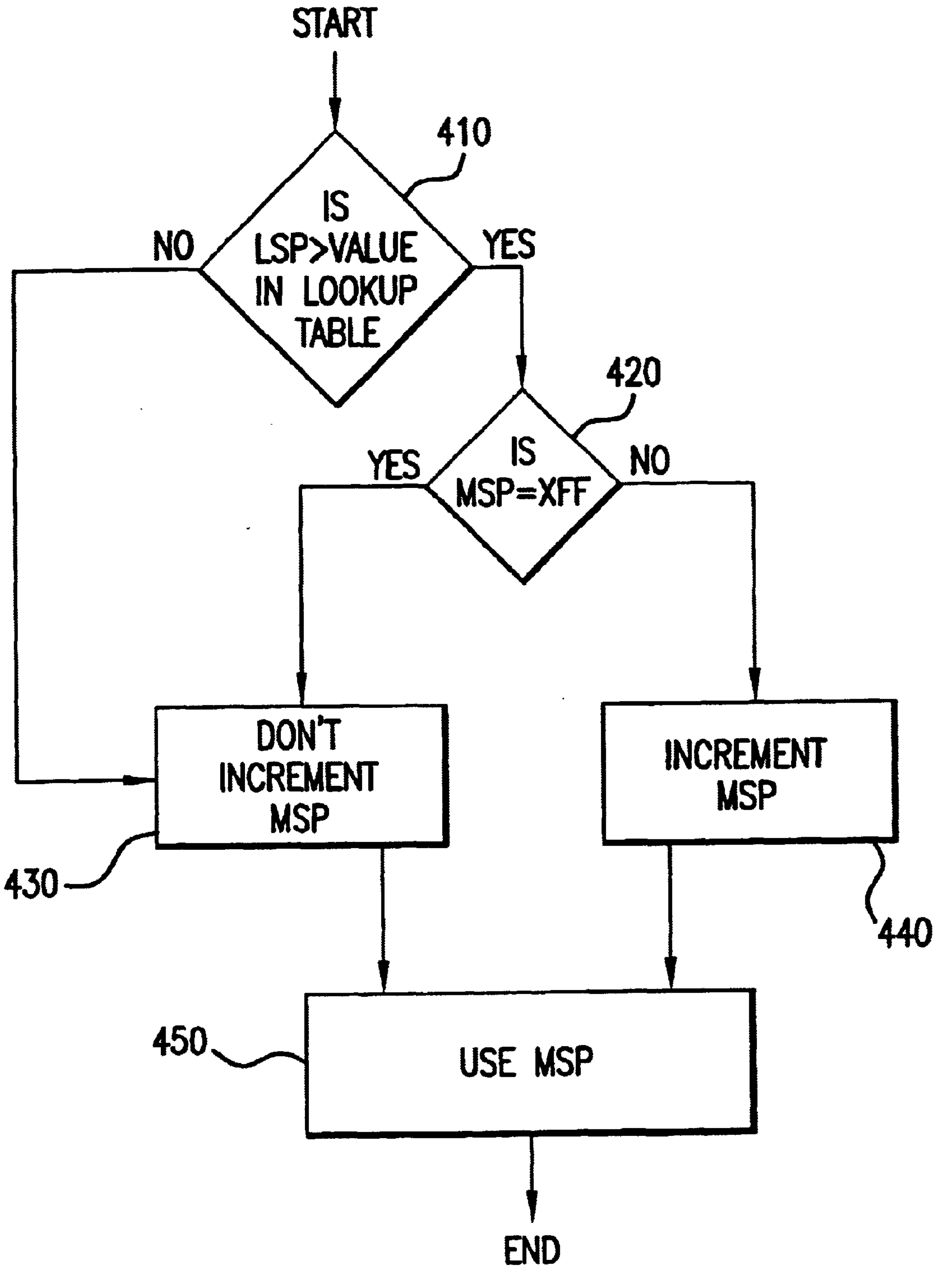
FIG. 6 shows a more detailed flow chart of step 330 of FIG. 4 for determining whether the most significant portion should be incremented.

FIG. 6 shows a more detailed flow chart of step 330 of FIG. 4 for determining whether the most significant portion should be incremented. The video data for each pixel is divided up into a least significant and most significant part for each color. The least significant part for a given color is then compared to a value within a look-up table (step 410). A lookup table functions to provide the ordered dithering patterns as shown in FIG. 3 by using the pixel's relative address for the color variation level to determine the value within the lookup table to compare the least significant part to. One example lookup table would have the values (0, 8, 2, 10, 12, 4, 14, 6, 3, 11, 1, 9, 15, 7, 13, 5). The value 0 would be compared to the least significant part of the video data value at the relative address (IJ), the value 8 would be compared to the least significant part of the video data value at the relative address (1,2) and so on until the value 5 was compared to the least significant part of the video data value at the relative address (4,4). If the value of the least significant part is less than the value in the lookup table, the most significant part is not incremented to the next highest color variation value (step 430). If the least significant part is more than the value in the look-up table, the most significant part is checked to see if it is at the maximum color variation level already (step 420). If it is at the maximum level the most significant part is not incremented (step 430). If the most significant part is not at the maximum level, then it may be incremented (step 440). The comparison step to see if the most significant part is already at the maximum color variation level may be performed at a previous point in the method. The most significant part is then output as the video data value for the color of the pixel (step 450). The steps of FIG. 6 are repeated for each color for a given pixel and are also repeated for each pixel within the subset area.

Even if a given subset area does not contain identically colored pixels, the ordered dithering still maintains a close approximation over the subset area for all low frequency color changes which is consistent with the eye's ability to perceive color. The ordered dithering technique is based on the fact that the human eye's ability to perceive color variation decreases with the size of the area being viewed. For example, if the area is a block of sixteen pixels all with the same color displayed on a computer monitor at a 0.28 dot pitch at a resolution of 800×600, the ordered dithering will provide an accurate representation of the desired increase in the levels of color accuracy based on the number of pixels provided within the block. If on the other hand all of the pixels within the block are of a different color, the human eye is incapable of distinguishing the color of individual pixels and only perceives luminance. If each pixel is increased to the next color accuracy level, the eye will fail to perceive this change, as such, there is no net loss to the color accuracy for these pixels. If the number of pixels that are of the same color accuracy level falls somewhere between that of all of the pixels being the same color and none of the pixels being the same color, the method produces an increased color accuracy which is directly proportional to the eye's decreased capacity to perceive color. For example, if half of the pixels are the same color in a block of sixteen pixels, the increase in color accuracy will be only eight levels or half that for a block in which all the pixels were the same color. However, the ability of the eye to perceive color variations is also diminished by half, resulting in a net gain which is equivalent to the the example in which all of the pixels are of the same color. It should be understood by those of ordinary skill in the art that the selection of a 4×4 block, a 0.28 dot pitch and an 800×600 resolution for a monitor was chosen for exemplary purposes. It should also be understood that the size of the individual pixels, the display resolution, and the block size are all parameters of size which effect the human eye's ability to distinguish color variations and that various combinations of these parameters may operate with the disclosed method.

Figure 7B:
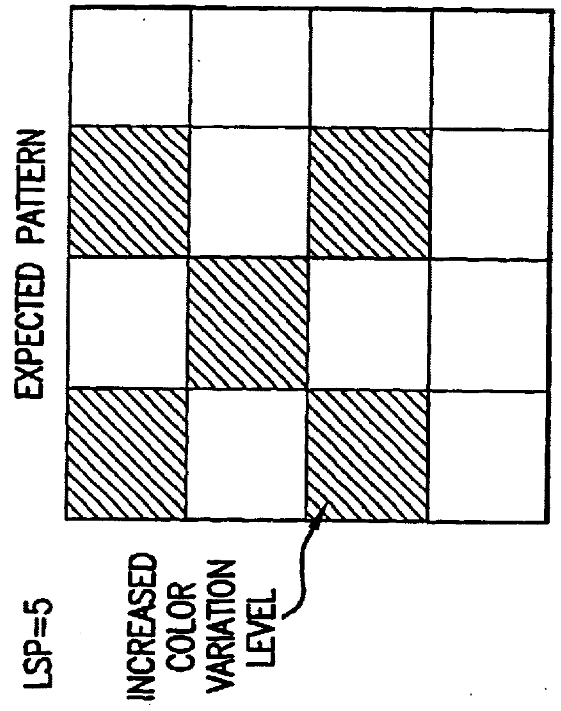
FIG. 7B shows the ordered pattern for FIG. 7A where the least significant portion is equal to 5.
Figure 7C:
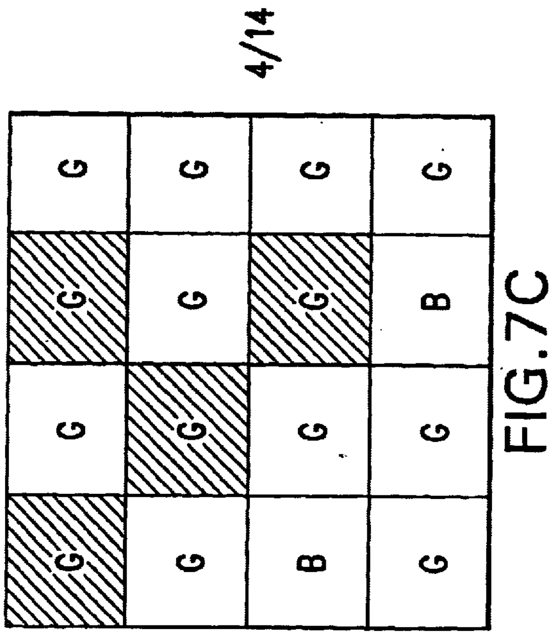
FIG. 7C shows the incremented pixels for the subset area of FIG. 7A.
Figure 7A:
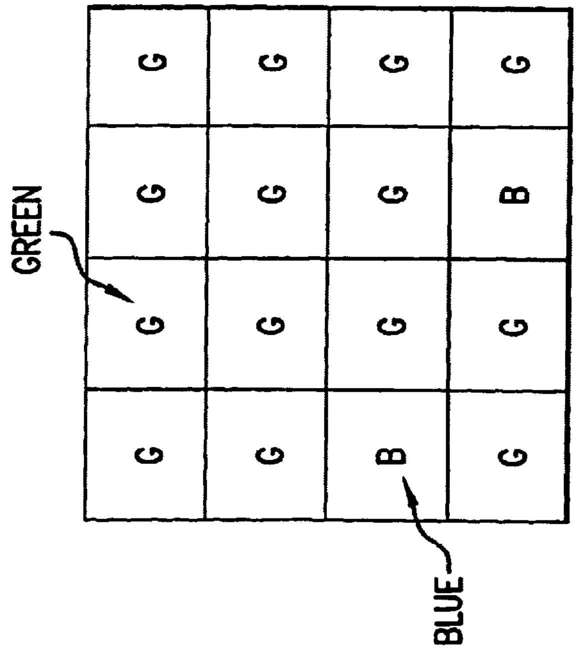
FIG. 7A shows a subset area having two different colors.

FIG. 7 shows an exemplary subset area in which all of the pixels are not the same color. In FIG. 7A, the video data values of two of the pixels of the subset of 16 are completely blue and the remaining 14 pixels have corresponding video data values which are completely green. As the method, described above, is applied, the video data values are separated into two parts, a least significant part and a most significant part. Based on the least significant part for each color of the video data value, a comparison is made with a predefined value in the lookup table. If the least significant part of the green video data value for the completely green pixels is equal to (0101), 5⁄16 of the pixels in the subset area would be set to the next highest green color variation level to precisely define the color and the pixels in the position as shown by the shaded areas of FIG. 7B would be the incremented pixels. FIG. 7B is the ordered pattern achieved for 5 pixels being set to the next highest color variation level for a subset area of 16 pixels as also shown in FIG. 3. When the comparison is done on a pixel by pixel basis with the values in the lookup table for the subset area of FIG. 7A, only 4⁄14 of the pixels are incremented to the next highest green color variation level. FIG. 7C shows the position of the pixels with the incremented values. Thus the appearance of the green color for the subset area is not exactly equal to the desired color shade of green although the increment in color is all that is perceivable to the human eye, since the effective area of the block is reduced to a block of 14 pixels from 16 pixels. The green color is off for this example by the difference between 5⁄16 and 4⁄14.

If random dithering were used as an alternative to ordered dithering, the accuracy of the color would not be achieved. In a random dithering implementation, the least significant part of a pixel's value for a given color (R,G, or B) would detern-dne a threshold equal to or below which pixels would be incremented to the next color level for that given color (R,G,B). In such an embodiment a random number generator produces a limited number of random numbers constrained by the number of pixels in the subset area. As a result, an even distribution of values above or below the threshold is not possible, since random number generators rely on a large set of values for the production of an even distribution and the number of pixels of any given subset area must be constrained to a size for which it is probable that all of the pixels within the subset area will be of the same color. This constraint results from the desired result which is deceiving the eye into believing that a different color is being represented. This different color requires that a subset area of pixels initially have the same color wherein a certain number of pixels are increased to the next highest color accuracy level to achieve a color which normally could not be represented by the system. For this reason the number of pixels within the subset must be constrained and therefore the random number generator cannot accurately generate a random number. As such, the pixels will be set to a higher or lower color variation level than desired resulting in an inaccurate color representation which decreases the color accuracy. Further, since the distribution would be random as opposed to being set, color banding could occur.

Figure 8:
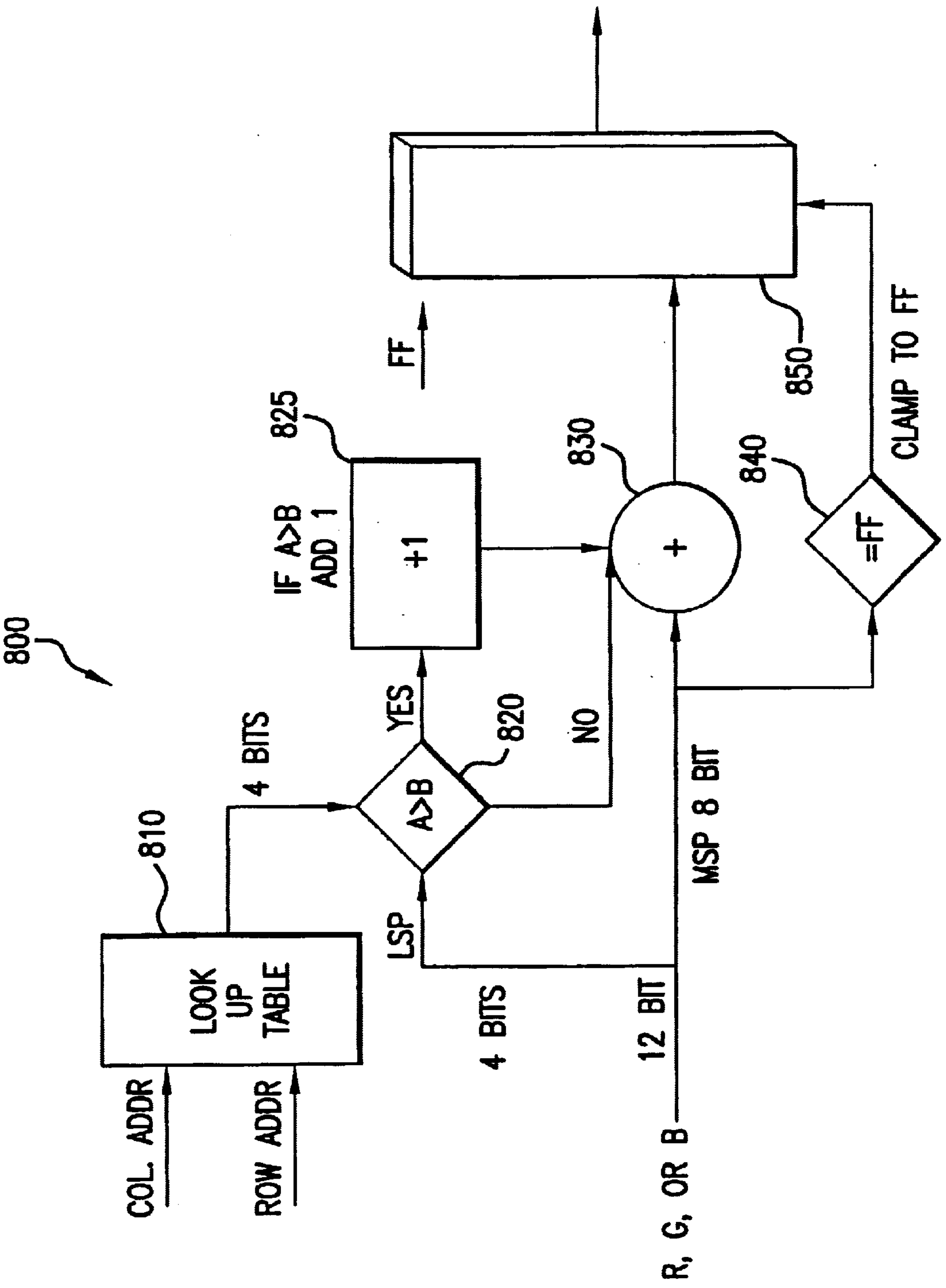
FIG. 8 shows a schematic drawing of one embodiment of an ordered dithering module.

FIG. 8 shows a schematic drawing of one embodiment of an ordered dithering module 800. The column and row address for a pixel is passed into a look up table module 810. The lookup table module 810 determines an output value based upon the input address. Concurrently, an R, G, or B video data value for the pixel whose address is used to determine an output from the look-up table is passed into the ordered dithering module 800 where the most significant portion is separated from the least significant portion. A comparator 820 receives both the least significant portion and the output of the look up table module 810 and compares the two values. If the least significant portion is greater than the output of the look-up table 800 then a value of one is sent to an adder 830 by module 825. If the least significant portion is less than the output of the lookup table then a zero or low bit is passed to the adder through module 825. The most significant portion is also directed to the adder 830 and directed to a comparator 840 which compares the most significant portion to the maximum value for the output. If the most significant portion is equal to the maximum value the output sends a signal to a multiplexor 850 which is the select signal. This causes the multiplexor 850 to output the maximum value rather than the output of the adder 830. If the value is less than that of the maximum output value the select signal causes the output to be the output from the adder 830.

In an alternative embodiment, the disclosed method may be implemented as a computer program product for use with a computer system. Such implementation may include a series of computer instructions fixed either on a tangible medium, such as a computer readable media (e.g., a diskette, CD-ROM, ROM, or fixed disk) or transmittable to a computer system, via a modem or other interface device, such as a communications adapter connected to a network over a medium. Medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method for converting color data from a higher color resolution to a lower color resolution, the method comprising the following steps:

a. receiving a plurality of bits representing color data for an image;

b. selecting a subset of pixels represented by said plurality of bits;

c. dividing, for each pixel within said selected subset, the color data into least significant bits and most significant bits;

d. comparing, for each pixel within said selected subset, said least significant bits to a corresponding value in a lookup table; and e. incrementing, for each pixel within said selected subset, said most significant bits if said least significant bits are greater than said corresponding value in said lookup table.

* * * * *